United States Patent [19]

Green

[11] 4,296,487

[45] Oct. 20, 1981

[54] PRESSURE SENSITIVE LINE TRANSDUCER

[75] Inventor: Milton Green, New London, Conn.

[73] Assignee: The United States of America as represented by the Secretary of the Navy, Washington, D.C.

[21] Appl. No.: 87,285

[22] Filed: Oct. 22, 1979

[51] Int. Cl.³ .................... G01V 1/16; G01V 1/38
[52] U.S. Cl. ................... 367/169; 367/149; 29/594
[58] Field of Search .......... 367/141, 149, 169, 170; 29/594, 602 A; 174/101.5

[56] References Cited

U.S. PATENT DOCUMENTS

| | | | |
|---|---|---|---|
| 2,367,211 | 1/1945 | Greenfield | 367/149 |
| 2,987,701 | 6/1961 | Grannemann | 367/21 |
| 3,317,891 | 5/1967 | Bradley | 367/169 |
| 3,940,732 | 2/1976 | Hudson et al. | 174/101.5 |
| 3,979,713 | 9/1976 | Parrach | 367/21 |
| 4,011,540 | 3/1977 | Fair | 367/169 |
| 4,090,168 | 5/1978 | Muller et al. | 367/131 |
| 4,176,339 | 11/1979 | Konrad | 367/149 |

*Primary Examiner*—Nelson Moskowitz
*Attorney, Agent, or Firm*—Richard S. Sciascia; Arthur A. McGill

[57] ABSTRACT

A pressure sensitive line transducer wherein electrical signals are generated by the modulation of the electrical resistance of a coaxial cable due to pressure variations because of an impinging acoustic wave. The signals are extracted via a step-up transformer, amplified, filtered and processed by a computer and displayed to extract information about the acoustic wave.

4 Claims, 3 Drawing Figures

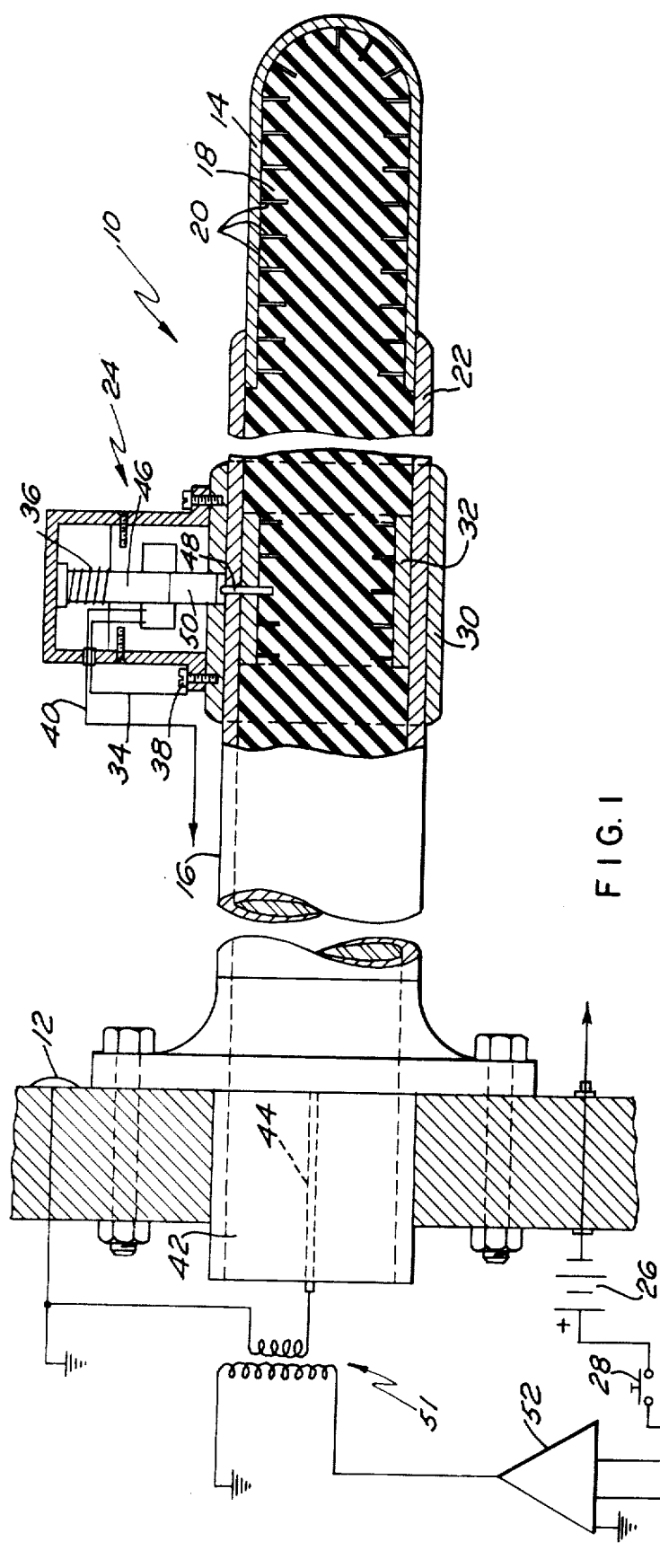
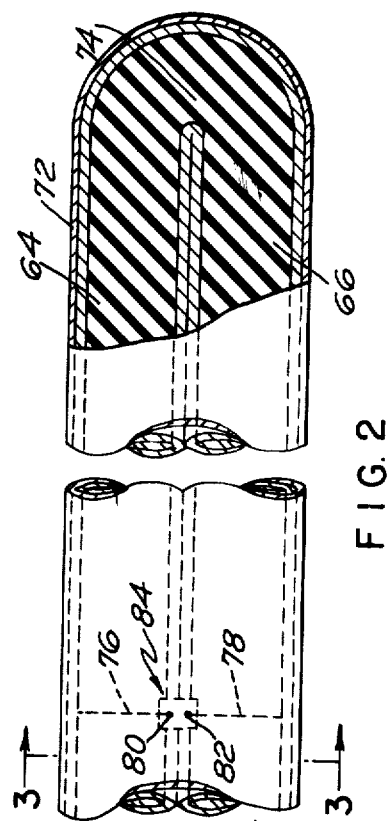
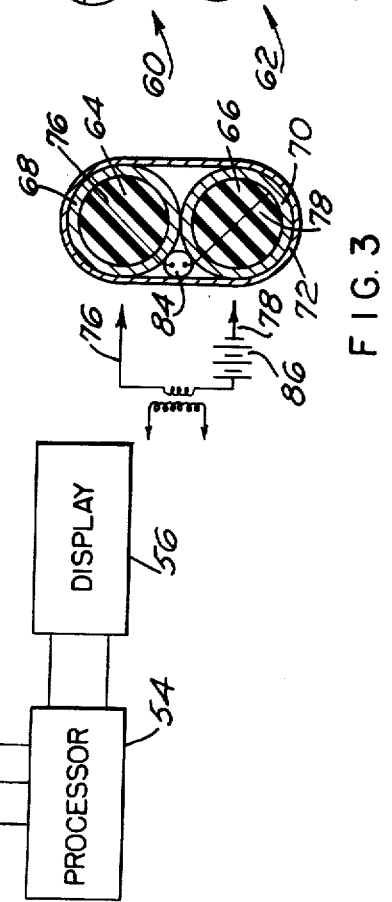

PRESSURE SENSITIVE LINE TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to hydrophones for a line array and particularly to a pressure sensitive line transducer.

Towed line arrays have been extensively used to detect and locate an object such as a submarine under water by the sound it makes. When operating properly, they have good sensitivity and directionality. However, their chief drawbacks are that they are complicated and are troubled by flow noise. Furthermore, they are expensive to build and getting good signals through their multiplexing or transmission lines from each element of the array causes many problems. It is thus questionable whether their performance is that much better for the high cost, considering all the troubles the experiment models have encountered. It is thus desirable to have a simple and relatively inexpensive system of accomplishing the same objective as by using towed thin line arrays.

SUMMARY OF THE INVENTION

Pressure sensitive acoustic detecting device according to the teachings of subject invention is a pressure sensitive line transducer wherein electrical signals are generated by the modulation of a coaxial cable resistance due to pressure variation of an acoustic wave. The electrical signals are extracted via a step-up transformer, amplified, filtered and processed by a computer and displayed to extract information about the acoustic wave.

An object of subject invention is to provide a pressure sensitive line transducer using the modulation of the electrical resistance of a coaxial cable.

Another object of the subject invention is to have a simple line transducer of sufficient sensitivity.

Still another object of subject invention is to have a line transducer which uniquely determines the direction of an acoustic source.

Still another object of subject invention is to have a line transducer wherein the acoustic impedance of the line can be matched to that of ocean water.

Still another object of subject invention is to have a line transducer which does not require complicated multiplexing means for transmission of the signal in response to pressure variations due to an impinging acoustic source.

Other objects, advantages and novel features of the invention will become apparent from the following detailed description of the drawings when considered in conjunction with the accompanying drawings wherein:

BRIEF DESCRIPTION OF THE DRAWINGS

FIG. 1 is a partially cross-sectional and partially schematic view of the line transducer built according to the teachings of subject invention; and FIGS. 2 and 3 schematically show another embodiment of the device built according to the teachings of subject invention.

DESCRIPTION OF PREFERRED EMBODIMENTS

Referring to the drawings, FIG. 1 shows a pressure sensitive line transducer 10 built according to the teachings of subject invention. As shown therein, the DC or bias current is supplied via the anti-corrosion electrode 12 of the vessel which forms a part of an electro-chemical cell supplying the bias current. It should be understood that other types of DC sources for obtaining the bias current can be used just as well. Furthermore, AC type carrier frequencies can also be used for this purpose. The second electrode of the electro-chemical cell is the terminal cladding 14 of the hydrophone cable 16. The current flows through the conducting seawater in which the hydrophone 10 is submersed. A suitable cladding material is copper or copper-bronze. However, other suitable cladding materials can also be used. The cladding 14 is constructed to make a good ohmic contact with the pressure sensitive electrically conducting rubber center 18 of the hydrophone cable 16 by means of pins 20 protruding from the copper jacket 14 into the conducting rubber center 18. An insulating cover 22 shields the conducting rubber center 18 of the cable to prevent flow of electric current between the seawater and the conducting rubber center 18. Element 24 is an electro-magnetic solenoid which acts as a relay switch when actuated by the electric battery 26 on closing of the circuits through push button 28 mounted on the processor. The purpose of the solenoid switch 24 is to change the effective length of the line transducer cable 16 by producing essentially a short circuit between the external cladding 30 of the transducer line and the internal cladding 32. The latter is designed to make good electrical contact to the core 18 of the line. One of the leads 34 of the solenoid winding 36 is grounded to the cladding 30 via screw 38 and an appropriate lug and crimp screw. The other lead 40 of the solenoid is mounted on the side of the cable 16 and is brought into the vessel via an appropriately insulated feed through. The cable 16 is also brought through the hull via appropriately insulated connector 42 and the male connector pick-up pin 44. When the solenoid circuit is closed, the plunger 46 is brought down against the electrically conducting pin 48 making a good electric contact between the two claddings 30 and 32 via the pin 48 and the non-magnetic but electrically conducting portion 50 of the plunger 46 whose sides are in good electrical contact with cladding 30. The electrical signals generated by the modulation of the resistance of the cable 16 by the pressure variations of the impinging acoustic wave are extracted via the step-up transformer 51. The electrical signals are then amplified and filtered by the amplifier filter combination 52 as shown in FIG. 1. The signals then go through a computer processor 54 to determine the direction of the signals relative to the line hydrophone and are displayed on display 56. It should be noted that instead of a full connector 42 the system could employ a flexible hydrophone cable of the type described that could be wound on a spool so that the length of the cable in the water could be varied by rolling the line cable in or out of the spool and calibrating the length of the cable in water via a counter coupled to the shaft of rotation of the spool. Alternatively, in order that the hydrophone line be removed a considerable distance from the vessel so as to reduce sound pickup from the vessel, the line transducer can be fastened in series electrically with an electric cable which is acoustically insensitive. This cable is also insulated from the ocean environments and can be wheeled in or out on the spool to a desired distance from the vessel. FIGS. 2 and 3 schematically show another embodiment of a parallel line hydrophone. This includes two cables, 60 and 62 of the type shown in FIG. 1. The conducting pressure-sensitive cores 64 and 66 are surrounded by insulated coatings 68 and 70 which are held together by an insulating outer sheathing 72. The cores 64 and 66 are electrically continuous at the termination region 74. Means for changing the length of the line is derived from the embedded wires 76 and 78 which make good electrical contact with the conducting rubber cores 64 and 66. These embedded wires are terminated at the contact points 80 and 82 of the relay switch 84. The solenoid mechanism and electrical leads to supply the energy to actuate the relay are similar to those shown in the embodiment shown in FIG. 1. FIG. 3 is a cross-sectional view of FIG. 2 taken along line 3—3 of FIG. 2. The output circuit of the parallel line hydrophone of FIG. 2 is substantially the same as that of FIG. 1 except that the bias current is supplied by battery 86 instead of the anti-corrosion zinc electrode current flowing through the seawater.

Briefly stated, a pressure sensitive line transducer for detecting objects under water is disclosed. The transducer comprises a coaxial cable having its electrical resistance dependent on the pressure changes to which it is subjected. The electrical signals generated by the modulation of pressure variations of the impinging acoustic wave upon the cable resistance are extracted by a step-up transformer, amplified, filtered and computer processed to produce a graphic display.

Obviously, many modifications and variations of the present invention may become apparent in the light of the above teachings. As an example, the electro-chemical cell used to provide DC or bias current may be replaced by some alternative DC source or by an AC source of carrier frequencies. Furthermore, the cladding material used may be any other conducting material besides copper or copper-bronze. It is therefore understood that within the scope of the appended claims the invention may be practiced otherwise than as specifically described.

I claim:

1. A line transducer for sensing pressure variations due to acoustic waves generated by an acoustic source comprising:

an elongated cable including a pressure sensitive electrical core element generating electrical signals in response to said acoustic waves of said acoustic source, said electrical core element of said elongated cable is an electrically conducting rubber that is insulated for preventing flow of electric current between said electrically conducting core element and a medium around said line transducer;

means for isolating said electrical signals from ambient noise including a solenoid for shorting an internal cladding of said elongated cable and an external cladding thereof; and means for processing said electrical signals.

2. The line transducer of claim 1 wherein said means for processing said electrical signal includes a display unit for displaying the characteristics of said acoustic waves generated by said acoustic source.

3. The line transducer of claim 2 wherein said line transducer forms a continuous length of an acoustic line array.

4. A line transducer of claim 1 wherein said elongated cable forms two lines for generating electrical signals in response to pressure variations due to the acoustic waves from said acoustic source.

* * * * *